United States Patent
Goel et al.

(10) Patent No.: US 9,622,023 B2
(45) Date of Patent: Apr. 11, 2017

(54) REMOTE WAKEUP OF SLEEPING SUBSYSTEMS

(71) Applicant: Qualcomm Atheros, Inc., San Diego, CA (US)

(72) Inventors: Amit Goel, San Diego, CA (US); Sunny Balkrishna Kapdi, San Diego, CA (US); Balaji Gudavalli, San Diego, CA (US); Matthew Lopatka, San Diego, CA (US); John Richard Sorenson, San Diego, CA (US)

(73) Assignee: Qualcomm Atheros, Inc., San Diego, CA (US)

( * ) Notice: Subject to any disclaimer, the term of this patent is extended or adjusted under 35 U.S.C. 154(b) by 0 days.

(21) Appl. No.: 14/859,621

(22) Filed: Sep. 21, 2015

(65) Prior Publication Data

US 2016/0088425 A1    Mar. 24, 2016

Related U.S. Application Data

(60) Provisional application No. 62/054,283, filed on Sep. 23, 2014.

(51) Int. Cl.
*H04B 1/38* (2015.01)
*H04M 1/00* (2006.01)
*H04W 4/00* (2009.01)
*H04W 52/02* (2009.01)

(52) U.S. Cl.
CPC ....... *H04W 4/008* (2013.01); *H04W 52/0229* (2013.01); *H04W 52/0235* (2013.01)

(58) Field of Classification Search
CPC ............. H04W 4/008; H04W 52/0229; H04W 52/0235; H04W 52/0209; H04W 52/0274; H04W 52/028; H04B 5/00; H04B 5/02
See application file for complete search history.

(56) References Cited

U.S. PATENT DOCUMENTS

2013/0268788 A1* 10/2013 Baum ............... H04L 25/03891
                                                          713/323
2015/0373575 A1* 12/2015 Smadi ............... H04W 28/0215
                                                          370/236

* cited by examiner

*Primary Examiner* — Nguyen Vo
(74) *Attorney, Agent, or Firm* — Neugeboren O'Dowd PC

(57) ABSTRACT

A computing device and method for remotely waking sleeping subsystems of the computing device are disclosed. The method includes monitoring a plurality of hardware subsystems on the computing device to detect when at least one of the hardware subsystems goes into an idle state and initiating a remote-start advertisement in response to the at least one of the hardware subsystems going into an idle state. A wireless low energy module of the computing device is monitored for a remote start signal from a remote device, and the at least one of the hardware subsystems that is in an idle state is powered up in response to receiving a remote start signal from a remote device. The remote-start advertisement is then ended in response to the at least one of the hardware subsystems powering up.

20 Claims, 10 Drawing Sheets

REMOTE WAKEUP OF SLEEPING SUBSYSTEMS

CLAIM OF PRIORITY UNDER 35 U.S.C. §119

The present Application for Patent claims priority to Provisional Application No. 62/054,283 entitled "REMOTE WAKEUP OF SLEEPING SUBSYSTEMS" filed Sep. 23, 2014, and assigned to the assignee hereof and hereby expressly incorporated by reference herein.

BACKGROUND

Field

The present disclosure relates generally to computing systems, and more specifically to remotely controlling operation of subsystems on a computing device.

Background

With the advent of multiple processors or multiple cores on a single chip (also known as SoCs), processing tasks have been distributed to various processors or cores that specialize in a given function to provide enhanced performance. For instance, some smartphones now comprise a core for OS activities including audio decoding, a core for video decoding, a core for rendering and composing graphical frames, a core for composing frames, another core for handling WiFi data, and yet another core for telephony.

When processors such as those listed above are operating on a power constrained device (e.g., a device utilizing battery power), it is important for the processors to keep power consumption low while providing the performance benefits associated with multiple processors. Mobile communication devices including devices such as smartphones, tablet computers, gaming devices, and laptop computers are now ubiquitous. A common and ongoing issue with these types of devices is power management. Although advances continue to be made in the areas of battery technology and hardware efficiency, current mobile device power management techniques are not adequate to meet user expectations and will almost certainly not be satisfactory in the future.

The application processor (or app processor) in many mobile wireless communication devices (or user equipment (UE)) may be suspended to conserve power. App processors are also starting to see multiple cores, thus allowing one or more cores to be idled or put into an offline state to save power. Moreover, a typical communication device has several hardware components and corresponding drivers that may be suspended during idle periods. These power saving techniques save power at the expense of processing power, an acceptable tradeoff when the app processor or other hardware components are not being fully utilized anyway. Waking-up a system (or subsystem) from power saving standby mode, typically involved pressing a physical button on the device that triggers the wake up sequence for subsystem(s).

SUMMARY

According to an aspect, a computing device includes a plurality of hardware subsystems and a power module coupled to the hardware subsystems. The power module is configured to provide power to the hardware subsystems and place at least one of the hardware subsystems in idle mode to reduce a power load of the at least one hardware subsystem. A wireless transceiver is configured to communicate with a remote device via a wireless connection, and a subsystem-status advertiser is configured to prompt the wireless transceiver to send a remote-start advertisement that advertises the at least one hardware subsystem is in idle mode and available for a remote start. A remote start module is configured to receive, via the wireless transceiver, a remote start signal from the remote device and trigger the power module to take the at least one hardware subsystem out of idle mode in response to the remote start signal.

According to another aspect, a method for remotely waking sleeping subsystems of a computing device includes monitoring a plurality of hardware subsystems on the computing device to detect when at least one of the hardware subsystems goes into an idle state and initiating a remote-start advertisement in response to the at least one of the hardware subsystems going into an idle state. A wireless low energy module of the computing device is monitored for a remote start signal from a remote device, and the at least one of the hardware subsystems that is in an idle state is powered up in response to receiving the remote start signal from a remote device. The remote-start advertisement then ceases in response to the at least one of the hardware subsystems powering up.

DETAILED DESCRIPTION

Figure 1:
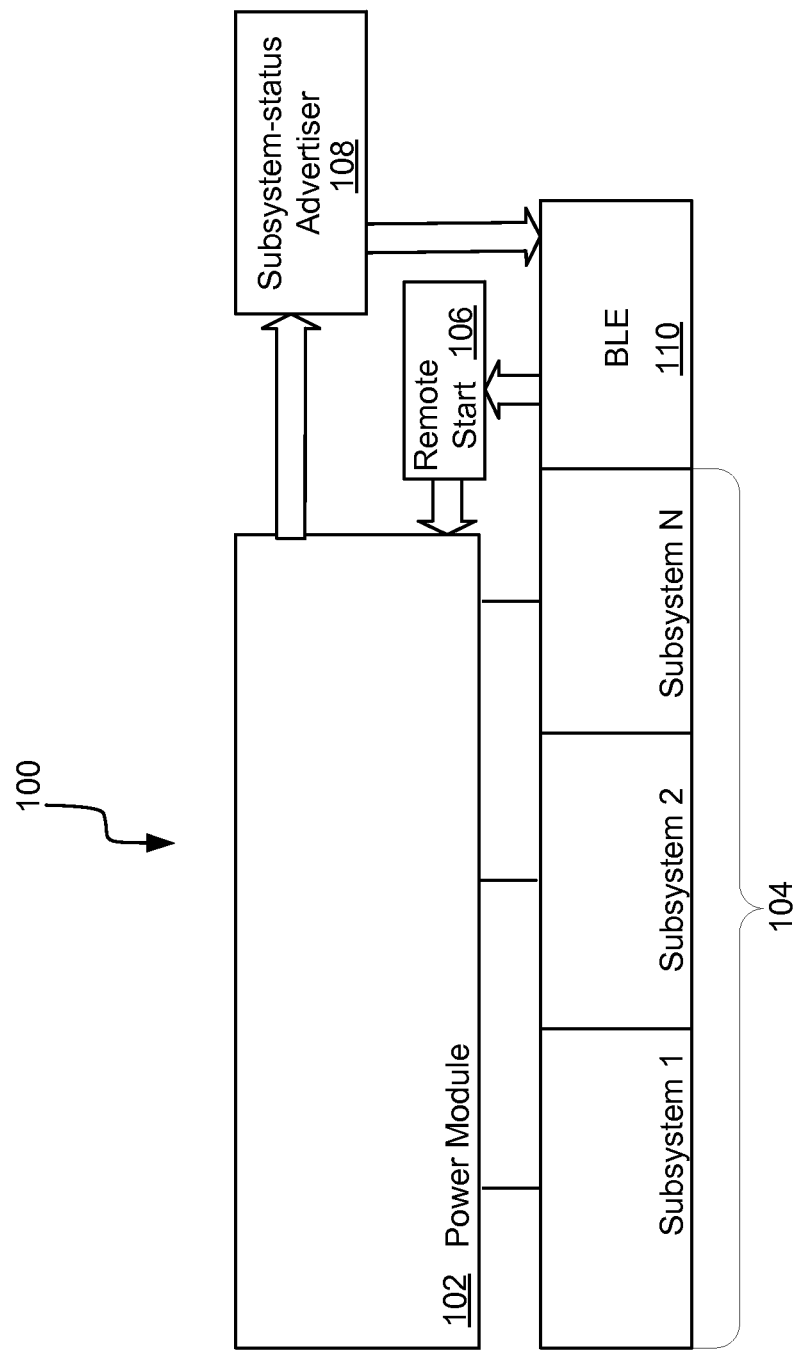
FIG. 1 is a block diagram of a computing device.

Referring first to FIG. 1, shown is a block diagram depicting a computing device 100. As shown, the computing device includes a power module 102 coupled to a plurality of subsystems 104, a remote start module 106, and subsystem-status advertiser 108. Also shown is a Bluetooth low energy (BLE) module 110, which is coupled to the remote start module 106 and the subsystem-status advertiser 108. Several embodiments of the computing device 100 disclosed herein enable a remote device (not shown in FIG. 1) to act as a wireless wakeup trigger for one or more of the subsystems 104 of the computing device 100.

It should be recognized that the depiction of components of the computing device 100 in FIG. 1 is intended to be a logical depiction of components as opposed to, for example, a detailed hardware diagram. As an example, functional aspects of the power module 102 may be realized in a distributed manner so that one or more of the subsystems 104 may be capable of entering an idle-mode without direction from a centralized component. As another example, one or more of the constituent components of the remote start module 106 or the subsystem-status advertiser 108 may be integrated with components of the power module 102 or BLE module 110.

It should also be recognized that many components of the computing device 100 are not depicted in FIG. 1 for purposes of clarity. For example, the computing device 100 may include several components associated with providing a user interface for a user, operating system components that underlie or are integral to the depicted components, and radio components for communicating wirelessly via wireless communication links. The depicted computing device 100 may be realized by any of a variety computing devices including wireless modem devices, smartphones, netbooks, laptops, ultrabooks, gaming devices, and a variety of other devices.

The power module 102 of the computing device 100 generally operates to manage an application of power to the subsystems 104. For example, the power module 102 is capable of selectively placing each of at least a portion of the subsystems 104 in an idle mode (also referred to as an idle state, power collapse state, low-power-mode, or low-power state), to reduce a power load of one or more of the subsystems 104. In addition, the power module 102 is configured to communicate a status of least some of the subsystems to the subsystem-status advertiser 108 as describe below. In addition, the power module 102 is configured to take one or more of the subsystems 104 out of idle mode when prompted by the remote start module 106, as discussed in more detail below.

Each of the subsystems 104 may be realized by a subsystem of the computing device 100 that has a specific functionality so that a particular one of the subsystems 104 may enter an idle mode when the functionality of that particular subsystem is not being utilized by the computing device 100. For example, the subsystems 104 may include a WiFi subsystem, a wide area network subsystem, an application processor, and a display subsystem that may be independently placed in an idle mode to reduce a power load of the subsystems 104. As discussed above, it is contemplated that one or more of the subsystems 104 may be configured to autonomously enter idle mode and then communicate power status to the subsystem-status advertiser 108. Although the subsystems 104 are hardware components that draw power to provide an inherent function, it should be recognized that the subsystems 104 may operate to execute software instructions and/or operate to respond to logic implemented in software executed by other hardware such as an applications processor.

The subsystem-status advertiser 108 generally operates to prompt the BLE module 110 to send one or more remote-start advertisements that provide an indication of a status of the hardware subsystems 104 that are in an idle mode and are available to be remotely started. As shown, the subsystem-status advertiser 108 is disposed to receive indications of which subsystems 104 are in idle mode from the power module 102, but in alternative implementations it is contemplated that the subsystem-status advertiser 108 receives power status information directly from one or more of the subsystems 104 (e.g., directly from a kernel-level driver associated with a subsystem).

The BLE module 110 generally operates to communicate remote-start advertisements as BLE connectable advertisements that can indicate to interested remote devices (operating as clients) that a remote start service is available to "wake up" certain subsystems 104 on computing device 100. The BLE advertisements can also optionally also indicate the specific subsystems 104 that are sleeping and can be woken up.

In addition, the BLE module 110 in connection with the remote start module 106 use BLE specifications as a wireless wakeup trigger for the computing device 100 to wake up subsystems 104, which the power module 102 has shut down. For example, a remote client device can establish a BLE connection with the BLE module 110 and trigger a wake up for the subsystem(s) of interest. According to another aspect, the BLE module 110 on the electronic device can filter certain remote client connections/requests based on configured criteria and will invoke a wakeup trigger only if the required criteria are met.

Some examples of filtering criteria are authorization criteria, system and battery level criteria, location criteria, and time criteria. Authorization criteria may enable a remote device address or name to be provisioned to allow wake up of a subsystem, or a remote device may provide a validation passcode to wake up a subsystem. System and battery level criteria may enable remote control of subsystems to be imitated based upon a status of the system or battery level. For example, if one subsystem is needed for something critical, and a current battery level is under a configured threshold, the remote wakeup request for a less important subsystem may be denied. Location criteria may place constraints upon where certain subsystems may be remotely controlled. For example, location criteria may be set to prevent a particular subsystem from being remotely started when the computing device is inside of a geo-fence. Time criteria enables remote control over subsystems to be disabled based upon defined date/time windows.

According to another aspect, the computing device 100 can stop BLE advertisements when there are no idle subsystems 104 to be woken up. Optionally, the subsystem-status advertiser 108 may continue to offer BLE advertisements to turn off certain subsystems 104; thus providing a remote turn off control to clients on addition to the wake up control. The computing device 100 can optionally continue to send out non-connectable advertisements when there are no subsystems 104 to wake up. These non-connectable advertisements can contain informational data for a client device. When the computing device 100 is implemented as a simple electronic device, a BLE connection itself can be treated as implicit trigger to wake up all required subsystems. In other words by virtue of a remote client device merely making a BLE connection with the BLE module 110, a preconfigured or system determined selection of required subsystems may be woken up.

Figure 2:
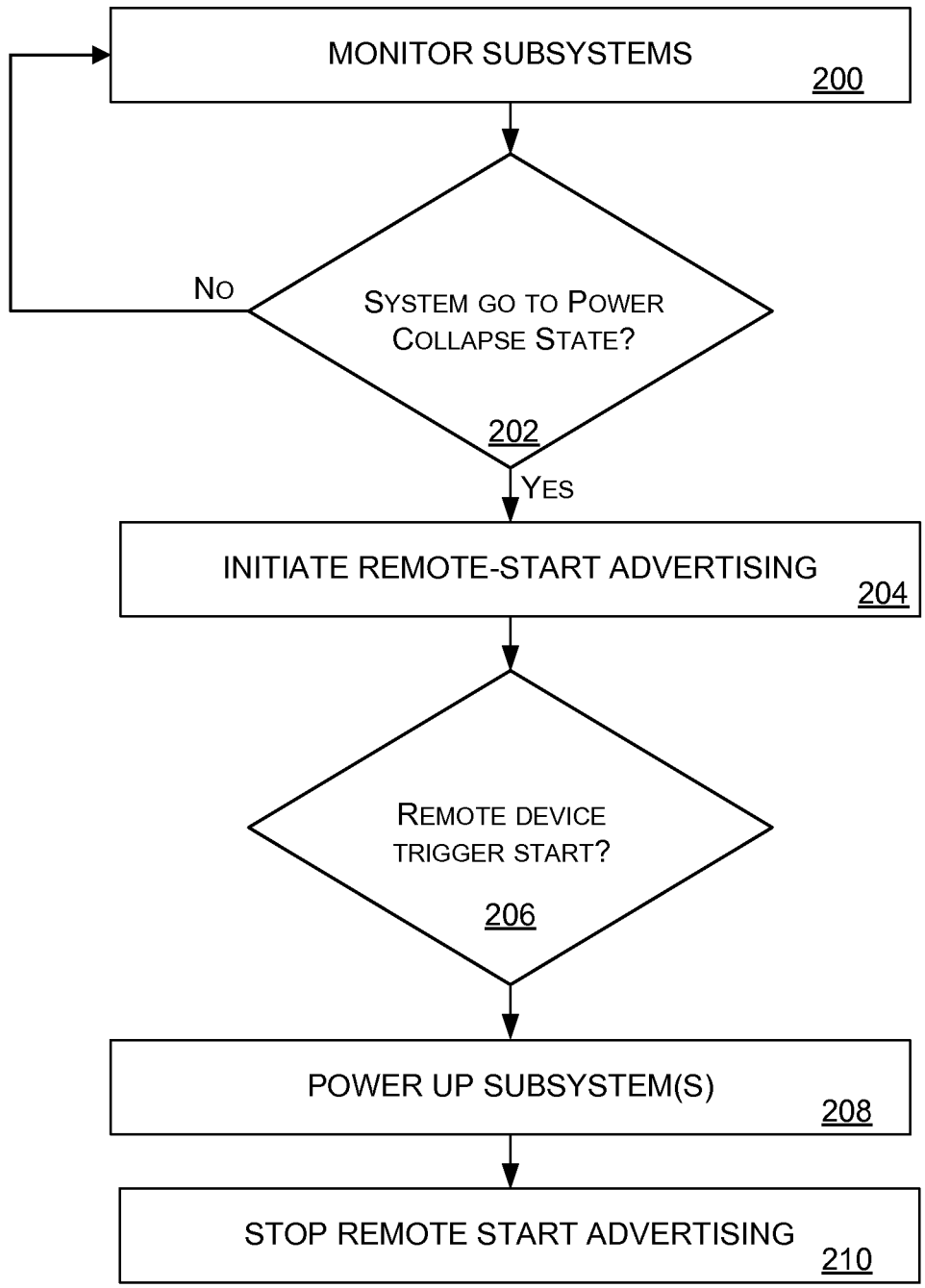
FIG. 2 is a flowchart depicting a method that may be traversed in connection with the several embodiments disclosed herein.
Figure 3:
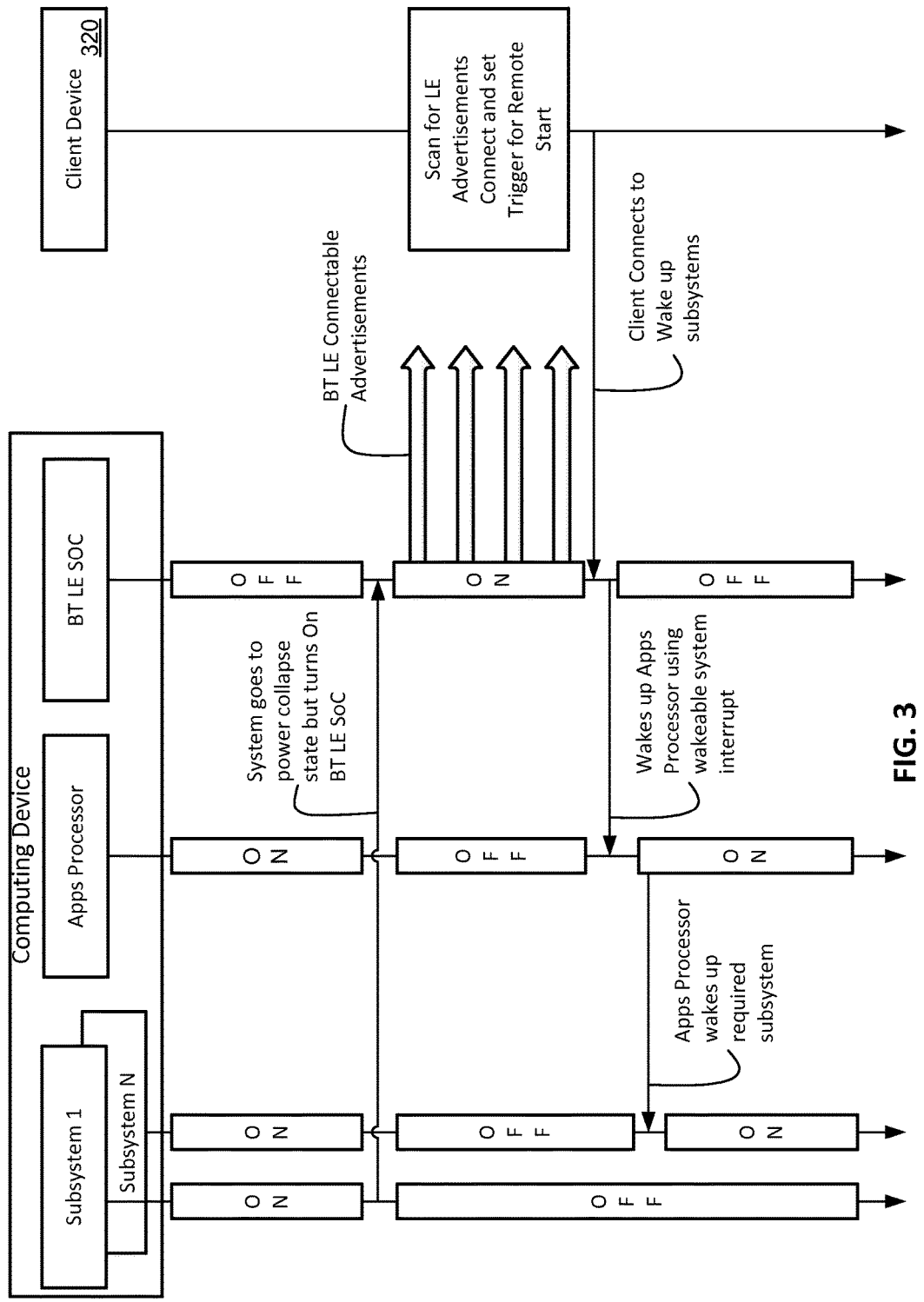
FIG. 3 is a block diagram depicting an example of communication flow between a computing device and a client device.

While referring to FIG. 1, simultaneous reference is made to FIGS. 2 and 3, which depict a flowchart and a communication flow diagram, respectively. Collectively FIGS. 2 and 3 depict operational flow on the computing device 100 and a communication flow between the computing device 100 and a remote client device associated with remote wakeup methodologies disclosed herein. Both the computing device 100 and the remote device may be realized by any of computing devices including a WAN-connected WiFi device, smartphones, netbooks, laptops, ultrabooks, gaming devices, and a variety of other devices.

As shown in FIG. 2, the subsystems 104 of the computing device 100 are monitored by the power module 102, and if one of the subsystems 104 goes to a power collapse state to operate in idle mode (Block 202), then the power module 102 prompts the subsystem-status advertiser 108 to prompt the BLE module 110 to initiate remote-start advertising (Block 204). As shown in FIG. 3, if there are no subsystems 104 in idle mode, the BLE module 110 may remain in an idle mode until turned on when one or more of the subsystems enters a low power mode. FIG. 3 also depicts a use case where several subsystems 104 (including an application processor) are in idle mode simultaneously, and the subsystem-status advertiser 108 sends a remote-start advertisement corresponding to each of the subsystems that are in idle mode.

As shown, if the computing device 100 receives a remote start signal from a client device (Block 206), then one or more of the subsystems 104 are powered up (Block 208). As discussed further herein, in some embodiments the remote start module 106 is configured to enable selected ones of the subsystems 104 to be powered up in response to remote start signals that each indicate which subsystem 104 is to be powered up. In yet other embodiments, the remote start signal is simply a client device becoming connected via the BLE module 110 with the computing device 100.

Figure 4:
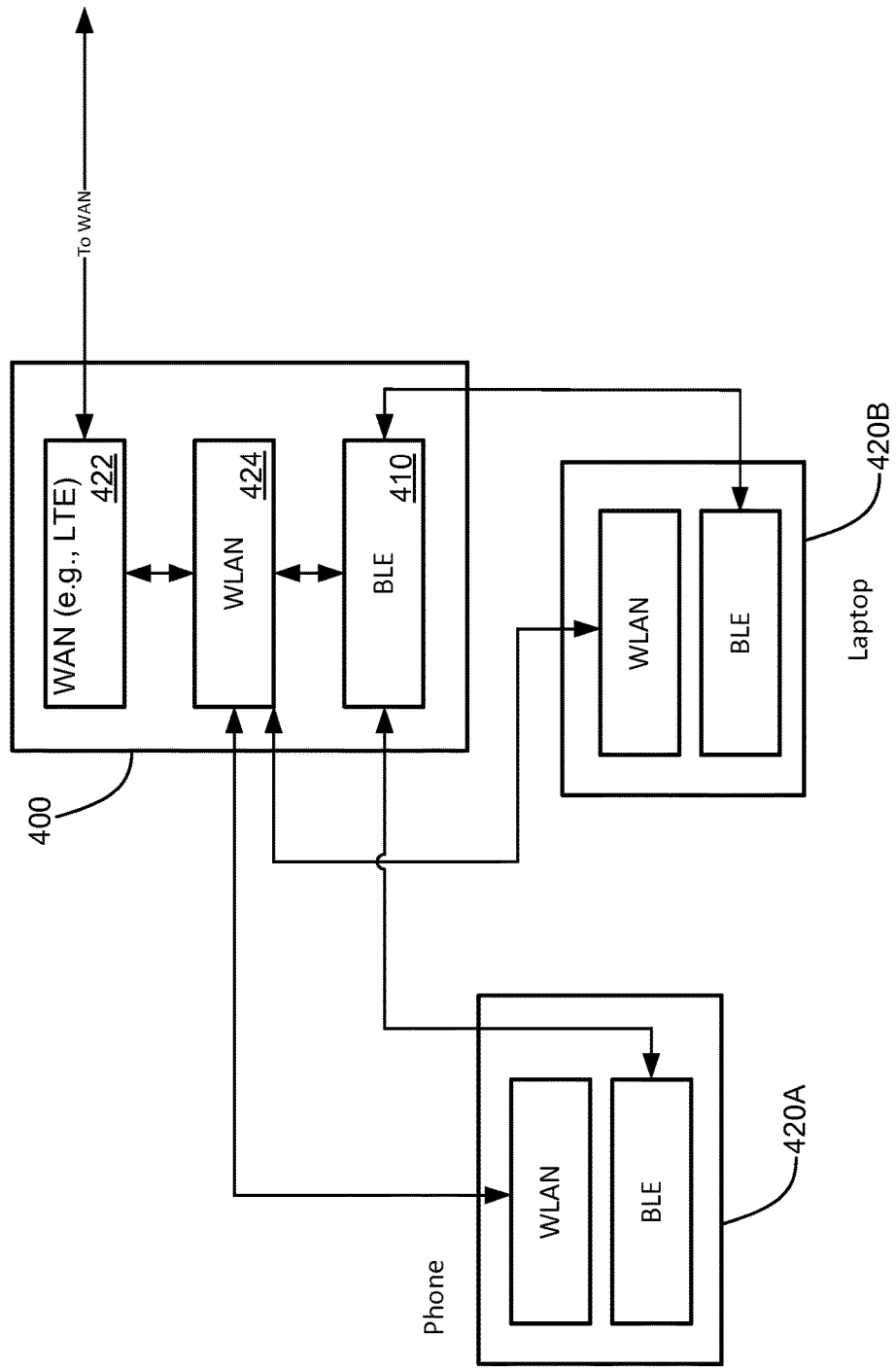
FIG. 4 is a block diagram depicting an embodiment in which the computing device described with reference to FIG. 1 is implemented as a mobile data modem (MDM) computing device.

Referring next to FIG. 4, shown is a block diagram depicting an environment in which the computing device 100 is realized by a mobile data modem (MDM) computing device 400 that includes the following subsystems: a wide area network (WAN) component (e.g., a long-term evolution (LTE) component) 422, a wireless local area network (WLAN) component 424, and a BLE module 410. Also shown are client devices including a smart phone 420A and a laptop 420B.

In general, the MDM computing device 400 functions to couple to the WAN to receive and transmit data (e.g., via a virtual private network, or data sent and received from remote Internet servers), and the WLAN component 424 enables the client devices 420A, 420B to access the WAN via a local area (e.g., WiFi) connection. For example, the WLAN component may expose a software access point (SoftAP) for the client device 420A, 420B. In this way, the computing device 400 may function as a wireless Internet router for the client devices 420A, 420B.

In some implementations, the MDM computing device 400 is a mobile device that has limited power resources; thus a power module (not shown) of the MDM computing device 400 may place the WLAN component (and potentially also the WAN component) in an idle mode to reduce a power load placed on the MDM computing device 400. In response, the BLE module 410 may send one or more remote-start advertisements that may be received by BLE modules residing on the client devices 420A, 420B.

Figure 5:
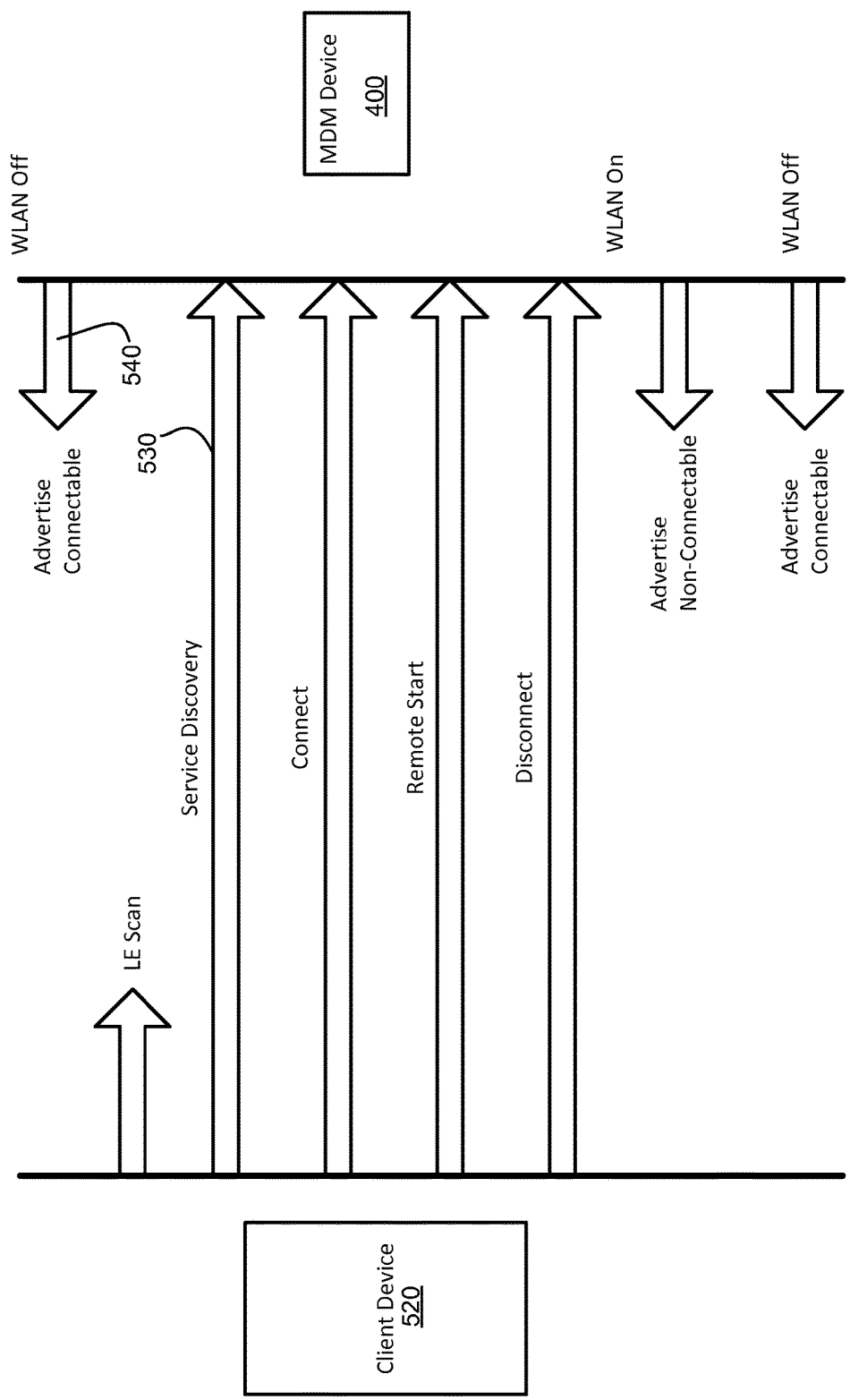
FIG. 5 depicts a selective remote start trigger use case that includes the MDM computing device and the client device described with reference to FIG. 4.
Figure 6:
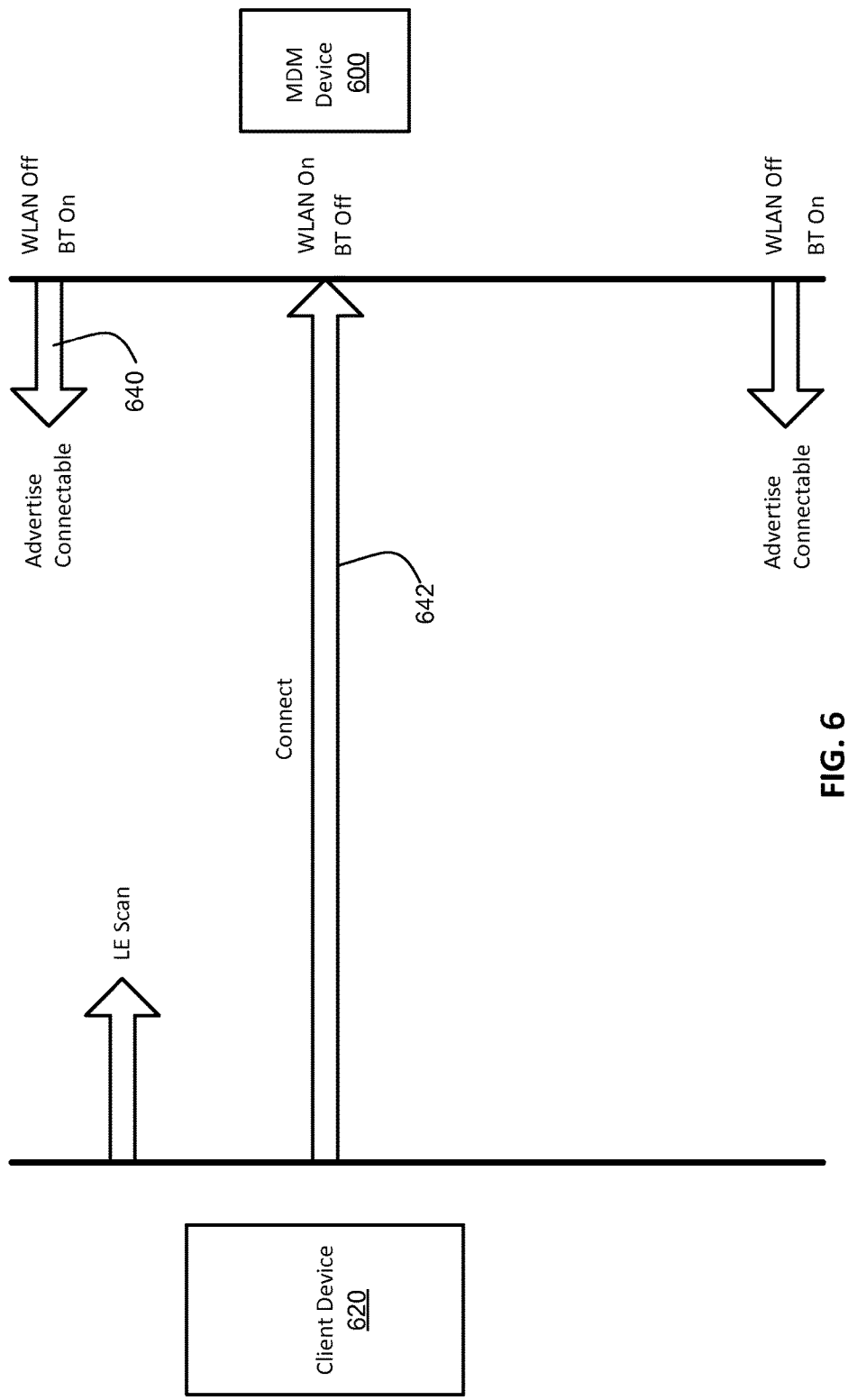
FIG. 6 is a drawing depicting an implicit remote start trigger use case between the MDM computing device and the client device described with reference to FIG. 4.

Referring to FIGS. 5 and 6, shown are a selective remote start trigger and implicit trigger use cases, respectively. With respect to the selective remote start trigger mode of operation depicted in FIG. 5, a client device 520 (e.g., client devices 420A, 420B) engage in service discovery 530 to identify particular services (e.g., remote start services) that are advertised via advertisements 540 as available on the MDM computing device 400. The client device 520 may then connect with the MDM computing device 400 and selectively trigger the remote start of a particular subsystem (e.g., the WLAN component) of the MDM computing device 400.

In contrast, FIG. 6 depicts a simple use case in which the remote-start advertising (Block 204) is effectuated at an MDM computing device 600 by simply sending an advertisement 640 that the MDM computing device 600 is connectable via a BLE connection. As shown, a simple connection 642 of a client device 620 to the MDM computing device 600 triggers a subsystem (e.g., WAN component 422 and/or WLAN component 424) to be powered up.

Figure 7:
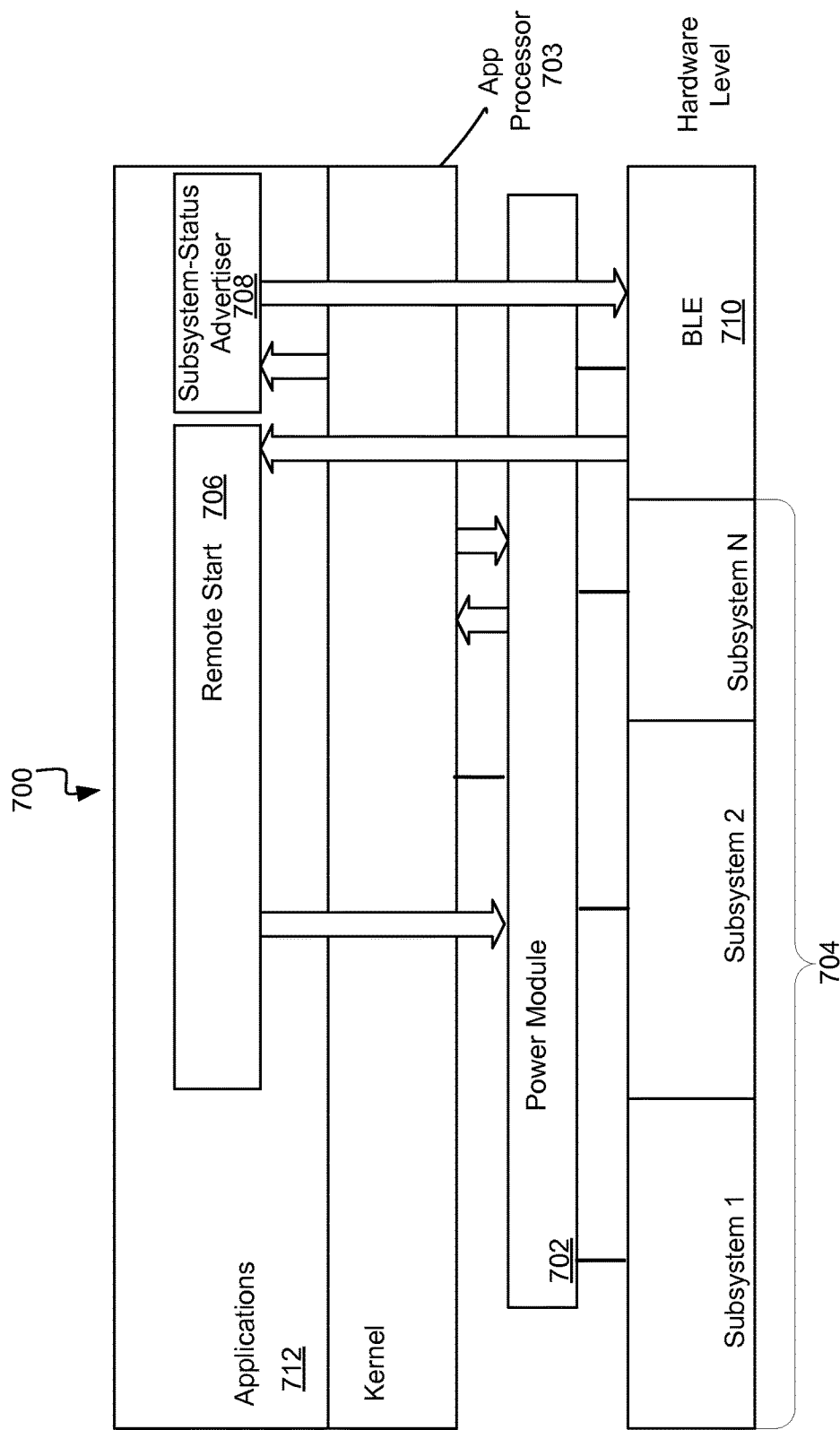
FIG. 7 is a block diagram depicting a particular embodiment of a computing device.

It should be recognized that the remote start module 106 and the subsystem-status advertiser 108 may be implemented in a variety of different ways. Referring next to FIG. 7 for example, shown is a block diagram depicting an exemplary computing device 700 that may be utilized to implement the computing device 100, 400 describe herein. In the embodiment depicted in FIG. 7, a remote start module 706 and subsystem-status advertiser 708 are implemented as processor-executable instructions at an applications level 712. As shown, in this embodiment a power module 702 is coupled to an application processor 703 and hardware subsystems 704 via power lines (to separately, and selectively, apply power to each of the subsystems). The remote start module 706 and subsystem-status advertiser 708 are realized by application-layer instructions that are executed by the application processor 703.

In this embodiment, the application processor 703, as instructed by the subsystem-status advertiser 708, prompts a BLE module 710 to send a remote-start advertisement that advertises that at least one hardware subsystem is in idle mode and available for a remote start. As one of ordinary skill will appreciate, the application processor 703 has an "awareness" of a power-status of each the subsystems 704; thus, the subsystem-status advertiser may send a plurality of different remote-start advertisements, which identifies a corresponding one of the plurality of hardware subsystems 704. For example, the remote-start advertisements may specifically advertise which of the hardware subsystems 704 are in idle mode and available for a remote start.

As depicted, the remote start module 706 in this embodiment is configured to receive, via the BLE module 710, a remote start signal from a remote device, and in response, the remote start module 706 triggers the power module 702 to take at least one of the hardware subsystem 704 out of idle mode. In many embodiments, for example the application processor 703 communicates with the power module 702 via a general purpose input/output (GPIO) port of the power module 702, and in turn, the power module 702 also communicates with the subsystems 104 via a GPIO port.

Figure 8:
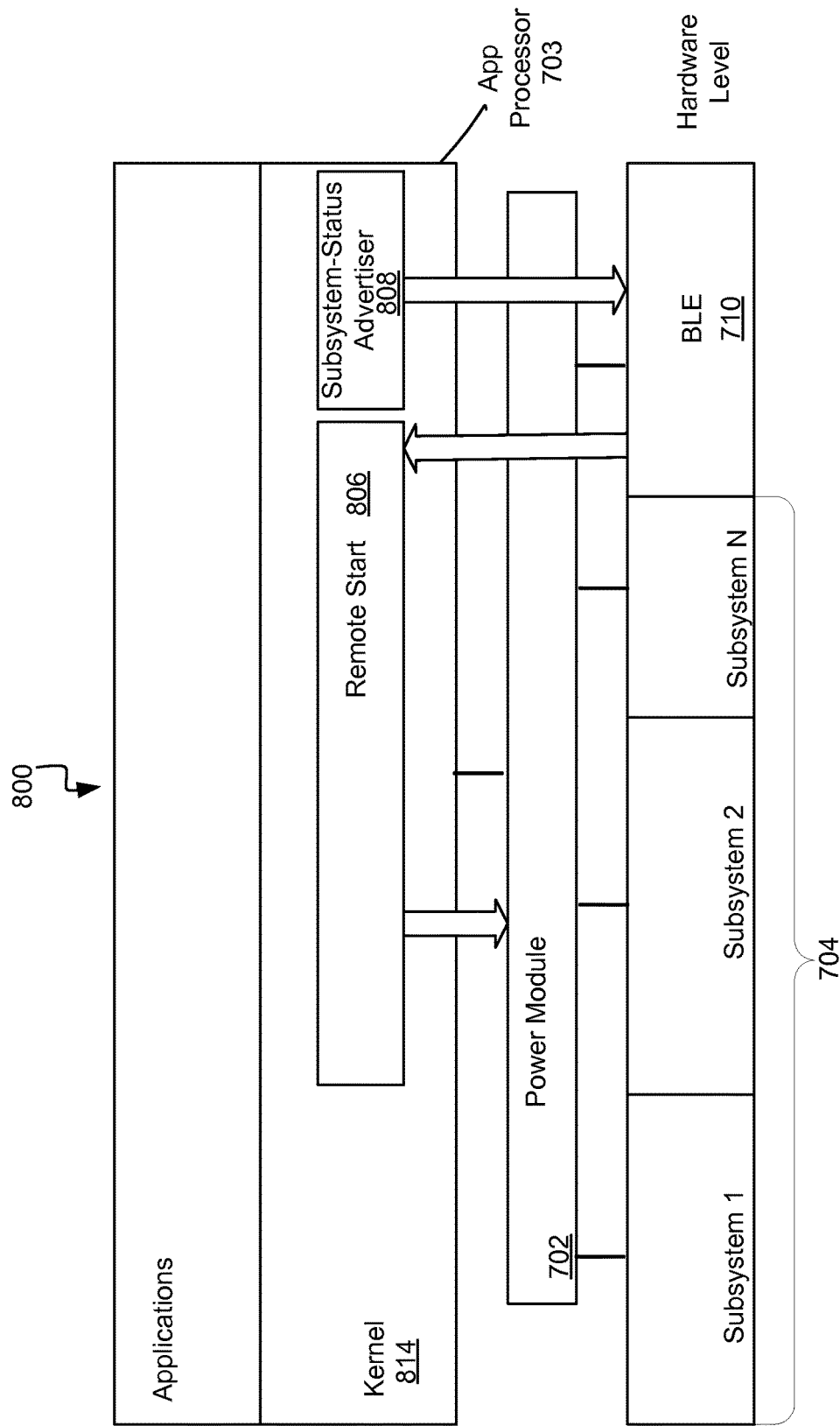
FIG. 8 is a block diagram depicting another embodiment of a computing device.

Referring next to FIG. 8, the computing device 800 implements the remote start module 806 and subsystem-status advertiser components as part of a kernel 814 of the computing device 800. The application processor 703 in this embodiment interoperates in much the same way with the power module 702 and the BLE module 710 except that the remote start module 806 and the subsystem-status advertiser 808 are realized by kernel-level instructions that are executed by the application processor 703.

Figure 9:
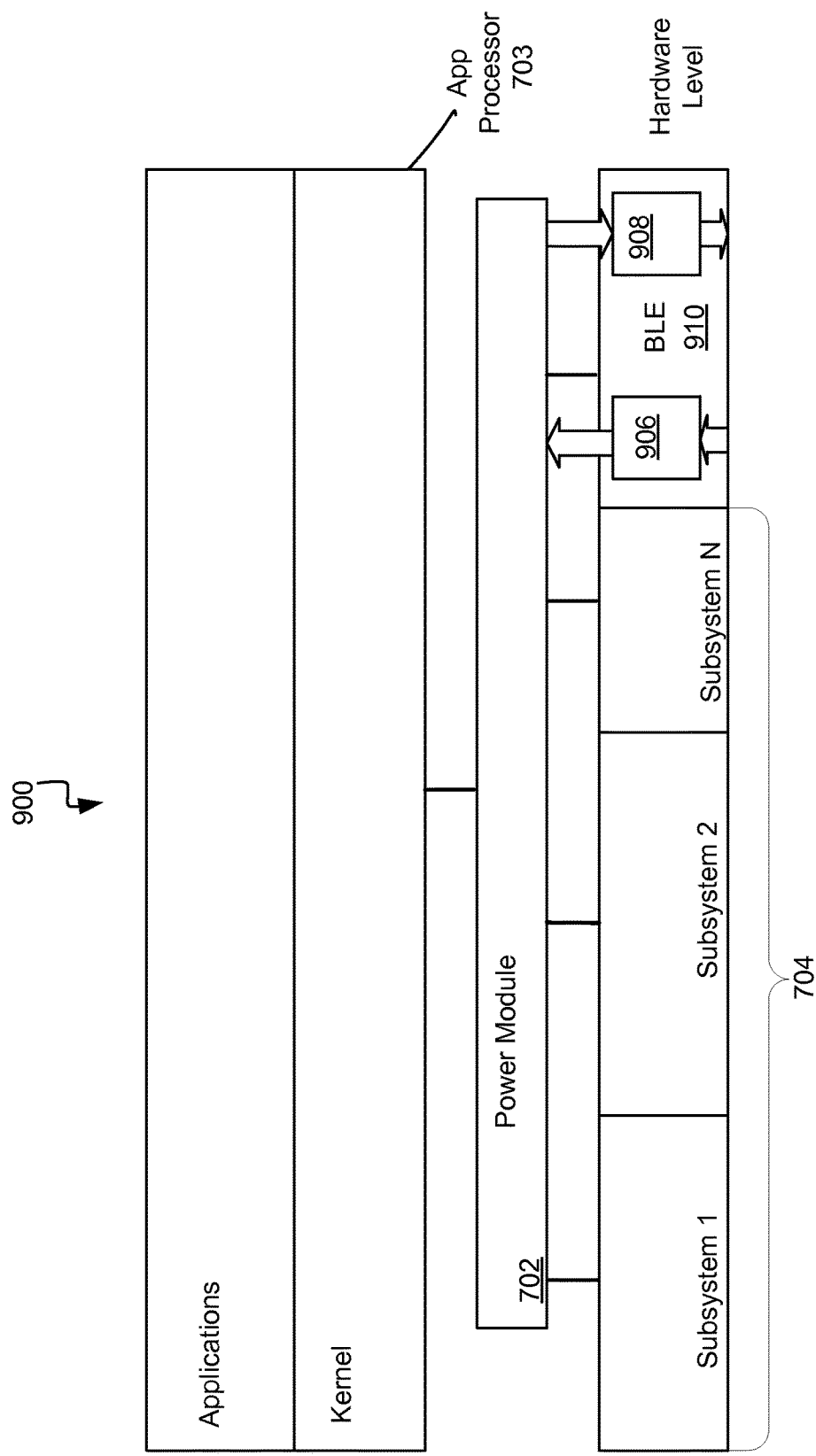
FIG. 9 is a block diagram depicting yet another embodiment of a computing device.

In contrast, the computing device 900 depicted in FIG. 9 implements a remote start module 906 and the subsystem-status advertiser 908 as a part of the BLE module 910. In this embodiment, the application processor 703 may also be placed in an idle mode and then remotely started in a similar manner as the subsystems 704. In a variation of this embodiment, the functionality of the remote start module 906 may be distributed between the BLE module 910 and the application processor 703 so that the application processor 703 may be powered up from an idle mode by the BLE module 910, and then the application processor 703 may power up one or more of the subsystems 704.

FIGS. 7-9 depict computing devices 700, 800, 900 that are variations of the computing device 100 described with reference to FIG. 1 in which the subsystem-status advertiser 108 and remote start module 106 are implemented in user space, the kernel, and the hardware level, respectively. But it should be recognized that these functions may be implemented in a variety of combinations. For example, the subsystem-status advertiser 108 may be implemented as part of the BLE module 110, and the remote start module 706 may be implemented in user space of the computing device 100.

Figure 10:
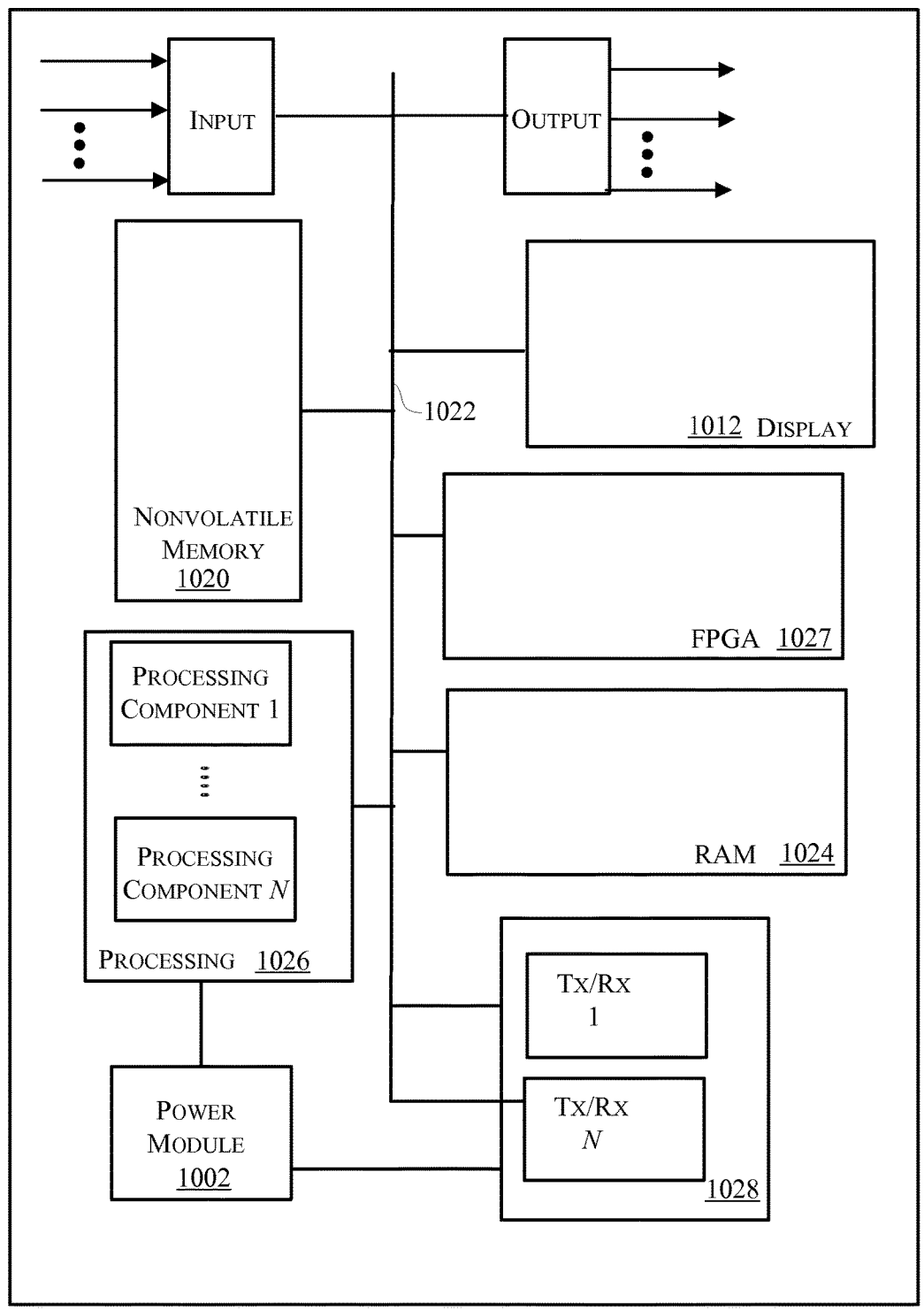
FIG. 10 is a block diagram depicted physical components of an exemplary computing device.

Referring next to FIG. 10, shown is a block diagram depicting physical components of a computing device that may be utilized to realize the computing devices 100, 400, 700, 800, 900 described herein. As shown, in this embodiment a display portion 1012 and nonvolatile memory 1020 are coupled to a bus 1022 that is also coupled to random access memory ("RAM") 1024, a processing portion (which includes N processing components) 1026, a field programmable gate array (FPGA) 1027, and a transceiver component 1028 that includes N transceivers. Although the components depicted in FIG. 10 represent physical components, FIG. 10 is not intended to be a detailed hardware diagram; thus many of the components depicted in FIG. 10 may be realized by common constructs or distributed among additional physical components. Moreover, it is contemplated that other existing and yet-to-be developed physical components and architectures may be utilized to implement the functional components described with reference to FIG. 10.

This display 1012 generally operates to provide a user interface for a user. The display 1012 may be realized, for example, by an LCD or AMOLED display, and in several implementations, the display 1012 is realized by a touchscreen display. In general, the nonvolatile memory 1020 is non-transitory memory that functions to store (e.g., persistently store) data and processor executable code (including executable code that is associated with effectuating the methods described herein). In some embodiments for example, the nonvolatile memory 1020 includes bootloader code, operating system code, file system code, and non-transitory processor-executable code to facilitate the execution of the methods described herein including the method described with reference to FIG. 2. Moreover, the non-volatile memory may be utilized to realize the subsystem-status advertiser 108 and the remote start module 106 described with reference to FIG. 1, and the variations of subsystem-status advertiser 108 and the remote start module 106 described herein.

In many implementations, the nonvolatile memory 1020 is realized by flash memory (e.g., NAND or ONENAND memory), but it is contemplated that other memory types may be utilized as well. Although it may be possible to execute the code from the nonvolatile memory 1020, the executable code in the nonvolatile memory is typically loaded into RAM 1024 and executed by one or more of the N processing components in the processing portion 1026.

The N processing components in connection with RAM 1024 generally operate to execute the instructions stored in nonvolatile memory 1020. For example the N processing components may include the application processor 703 which may execute non-transitory processor-executable instructions to effectuate the methods described with reference to FIG. 2. The non-transitory processor-executable instructions may be persistently stored in nonvolatile memory 1020 and executed by the N processing components in connection with RAM 1024. As one of ordinarily skill in the art will appreciate, the processing portion 1026 may include the application processor 703, a video processor, digital signal processor (DSP), graphics processing unit (GPU), and other processing components.

In addition, or in the alternative, the FPGA 1027 may be configured to effectuate one or more aspects of the methodologies described herein (e.g., the methods described with reference to FIG. 2). For example, non-transitory FPGA-configuration-instructions may be persistently stored in nonvolatile memory 1020 and accessed by the FPGA 1027 (e.g., during boot up) to configure the FPGA 1027 to effectuate functions of one or more of the components depicted in FIG. 1 including the remote start module 106 and the subsystem-status advertiser 108.

The depicted transceiver component 1028 includes N transceiver chains, which may be used for communicating with external devices via wireless or wireline networks. Each of the N transceiver chains may represent a transceiver associated with a particular communication scheme (e.g., Bluetooth low energy (BLE) module, WiFi, CDMA, Bluetooth, long-term evolution (LTE), NFC, etc.). For example, the transceiver chains may be utilized to realize transceivers of the WAN 422, WLAN 424, and BLE module 410 described with reference to FIG. 4.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

The invention claimed is:

1. A computing device comprising:
   a plurality of hardware subsystems;
   a power module coupled to the hardware subsystems, the power module configured to provide power to the hardware subsystems and place at least one of the hardware subsystems in idle mode;
   a wireless transceiver configured to communicate via a wireless connection;
   a subsystem-status advertiser configured to prompt the wireless transceiver to send a remote-start advertisement that the at least one hardware subsystem is in idle mode and available for a remote start; and
   a remote start module configured to:
      receive, via the wireless transceiver, a remote start signal; and
      trigger the power module to take the at least one hardware subsystem out of idle mode in response to the remote start signal.

2. The computing device of claim 1, wherein the plurality of subsystems include:
   a wireless modem configured to receive data from a cellular network; and
   a WiFi subsystem configured to present a software access point (SoftAP) on a remote device to enable the remote device to receive the data from the cellular network via the WiFi subsystem.

3. The computing device of claim 1, wherein the subsystem-status advertiser is configured to send one or more advertisements of one or more hardware subsystems that may be remotely turned off.

4. The computing device of claim 1, wherein the remote start signal is a Bluetooth low energy connection made between the computing device and a remote device.

5. The computing device of claim 1, wherein the subsystem-status advertiser is configured to send advertisements that no hardware subsystems are in idle mode.

6. The computing device of claim 1, wherein the subsystem-status advertiser is configured to send a plurality of different remote-start advertisements, each of the different remote-start advertisements identifying a corresponding one of the plurality of hardware subsystems.

7. The computing device of claim 1, including a Bluetooth low energy (BLE) module that is configured to filter remote start signals based upon configuration criteria to trigger the power module to take the at least one hardware subsystem out of idle mode only if required criteria are met.

8. The computing device of claim 7, wherein the configuration criteria is configuration criteria that is selected from the group consisting of authorization criteria; system and battery level criteria; location criteria; and time criteria.

9. A method for remotely waking sleeping subsystems of a computing device, the method including:
- monitoring a plurality of hardware subsystems on the computing device to detect when at least one of the hardware subsystems goes into an idle state;
- initiating a remote-start advertisement in response to the at least one of the hardware subsystems going into an idle state;
- monitoring a wireless low energy module of the computing device for a remote start signal;
- powering up the at least one of the hardware subsystems that is in an idle state in response to receiving the remote start signal;
- ceasing the remote-start advertisement in response to the at least one of the hardware subsystems waking up.

10. The method of claim 9 including:
- powering up a wireless cellular-communication subsystem of the computing device to receive data via a wireless cellular network;
- powering up a WiFi subsystem of the computing device; and
- presenting a software access point (SoftAP) on a remote device to receive the data from the cellular network via the WiFi subsystem.

11. The method of claim 9 including:
- sending one or more advertisements of one or more hardware subsystems that may be remotely turned off.

12. The method of claim 9, wherein the remote start signal is a Bluetooth low energy connection made between the computing device and a remote device.

13. The method of claim 9 including:
- sending advertisements that no hardware subsystems are in idle mode.

14. The method of claim 9, including filtering remote start requests based upon configuration criteria to power up the at least one of the hardware subsystems only if required criteria are met.

15. The method of claim 14, wherein the configuration criteria is configuration criteria that is selected from the group consisting of authorization criteria; system and battery level criteria; location criteria; and time criteria.

16. A non-transitory, tangible processor readable storage medium, encoded with processor readable instructions to perform a method for remotely waking sleeping subsystems of a computing device, the method including:
- monitoring a plurality of hardware subsystems on the computing device to detect when at least one of the hardware subsystems goes into an idle state;
- initiating a remote-start advertisement in response to the at least one of the hardware subsystems going into an idle state;
- monitoring a wireless low energy module of the computing device for a remote start signal;
- powering up the at least one of the hardware subsystems that is in an idle state in response to receiving the remote start signal;
- ceasing the remote-start advertisement in response to the at least one of the hardware subsystems waking up.

17. The non-transitory, tangible processor readable storage medium of claim 16, the method including:
- powering up a wireless cellular-communication subsystem of the computing device to receive data via a wireless cellular network;
- powering up a WiFi subsystem of the computing device; and
- presenting a software access point (SoftAP) on a remote device to enable the remote device to receive the data from the cellular network via the WiFi subsystem.

18. The non-transitory, tangible processor readable storage medium of claim 16, the method including:
- sending one or more advertisements of one or more hardware subsystems that may be remotely turned off.

19. The non-transitory, tangible processor readable storage medium of claim 16, wherein the remote start signal is a Bluetooth low energy connection made between the computing device and a remote device.

20. The non-transitory, tangible processor readable storage medium of claim 16, the method including:
- sending advertisements that no hardware subsystems are in idle mode.

* * * * *